(12) United States Patent
Ono et al.

(10) Patent No.: US 10,923,278 B2
(45) Date of Patent: Feb. 16, 2021

(54) MULTI-LAYER CERAMIC CAPACITOR

(71) Applicant: TAIYO YUDEN CO., LTD., Tokyo (JP)

(72) Inventors: Ryo Ono, Tokyo (JP); Tetsuhiko Fukuoka, Tokyo (JP); Shoji Kusumoto, Tokyo (JP); Akihiko Kono, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/918,372

(22) Filed: Mar. 12, 2018

(65) Prior Publication Data
US 2018/0294097 A1 Oct. 11, 2018

(30) Foreign Application Priority Data

Apr. 11, 2017 (JP) .............................. JP2017-078039

(51) Int. Cl.
| | | |
|---|---|---|
| *H01G 4/005* | (2006.01) | |
| *H01G 4/008* | (2006.01) | |
| *H01G 4/248* | (2006.01) | |
| *H01G 2/20* | (2006.01) | |
| *H01G 4/30* | (2006.01) | |
| *H01G 4/12* | (2006.01) | |

(Continued)

(52) U.S. Cl.
CPC ............... *H01G 2/20* (2013.01); *H01G 4/008* (2013.01); *H01G 4/0085* (2013.01); *H01G 4/12* (2013.01); *H01G 4/224* (2013.01); *H01G 4/30* (2013.01); *H01G 4/232* (2013.01); *H01G 4/248* (2013.01)

(58) Field of Classification Search
CPC .......... H01G 4/30; H01G 4/005; H01G 4/008; H01G 4/248; H01G 2/20
USPC ............ 361/321.2, 306.1, 306.3, 303, 321.1, 361/321.3, 301.4, 305
See application file for complete search history.

(56) References Cited

U.S. PATENT DOCUMENTS

| | | | | |
|---|---|---|---|---|
| 6,388,865 B1 * | 5/2002 | Honda | ...................... | H01G 4/30 |
| | | | | 361/301.4 |
| 8,351,181 B1 * | 1/2013 | Ahn | ........................ | H01G 4/30 |
| | | | | 361/306.1 |

(Continued)

FOREIGN PATENT DOCUMENTS

| | | |
|---|---|---|
| JP | 2014-143392 A | 8/2014 |
| JP | 2014-204113 A | 10/2014 |

*Primary Examiner* — Arun Ramaswamy
(74) *Attorney, Agent, or Firm* — Saliwanchik, Lloyd & Eisenschenk (57) ABSTRACT

A multi-layer ceramic capacitor includes a multi-layer unit and a side margin. The multi-layer unit includes ceramic layers laminated in a first direction, internal electrodes disposed between the ceramic layers, a main surface oriented in the first direction, a surface layer portion in a range from the main surface to a predetermined depth, and a center portion adjacent to the surface layer portion in the first direction. The side margin covers the multi-layer unit from a second direction orthogonal to the first direction. The ceramic layers have an average dimension in the first direction that is 0.4 μm or less. Each of the internal electrodes includes an oxidized region adjacent to the side margin. The oxidized region in the surface layer portion has a dimension in the second direction that is equal to or more than two times the average dimension of the ceramic layers in the first direction.

3 Claims, 10 Drawing Sheets

(51) Int. Cl.
*H01G 4/224* (2006.01)
*H01G 4/232* (2006.01)

(56) References Cited

U.S. PATENT DOCUMENTS

| | | |
|---|---|---|
| 9,384,897 B2 * | 7/2016 | Kim .................. H01G 4/30 |
| 2014/0177129 A1 * | 6/2014 | Lee ................ H01G 4/0085 |
| | | 361/301.4 |
| 2014/0185185 A1 | 7/2014 | Okajima et al. |
| 2014/0301014 A1 | 10/2014 | Kim |
| 2015/0170843 A1 * | 6/2015 | Kim ................ H01G 4/1209 |
| | | 361/301.4 |
| 2016/0293331 A1 * | 10/2016 | Kitamura ............ H01G 4/12 |

* cited by examiner

MULTI-LAYER CERAMIC CAPACITOR

CROSS-REFERENCE TO RELATED APPLICATION

This application claims the benefit under 35 U.S.C. § 119 of Japanese Patent Application No. 2017-078039, filed Apr. 11, 2017, the disclosure of which is herein incorporated by reference in its entirety.

BACKGROUND

The present invention relates to a multi-layer ceramic capacitor including side margins provided in a subsequent step.

There is known a technique of providing a side margin in a subsequent step in a method of producing a multi-layer ceramic capacitor, the side margin protecting the periphery of internal electrodes (see Japanese Patent Application Laid-open No. 2014-204113 (hereinafter referred to as Patent Document 1) and Japanese Patent Application Laid-open No. 2014-143392 (hereinafter referred to as Patent Document 2)). For example, Patent Document 1 describes a technique of producing a multi-layer body including internal electrodes exposed to the side surfaces of the multi-layer body, and then providing side margins to the side surfaces of the multi-layer body.

In the multi-layer ceramic capacitor produced by the technique of providing the side margins in a subsequent step, a short circuit between the internal electrodes is likely to occur in the vicinity of the side surfaces of the multi-layer body. In this regard, in the technique described in Patent Document 1, oxidized regions are provided to the leading ends of the internal electrodes, so that the occurrence of a short circuit between the internal electrodes is suppressed in the vicinity of the side surfaces of the multi-layer body.

SUMMARY

In order to achieve a further increase in capacitance of the multi-layer ceramic capacitor and miniaturization thereof, it is necessary to further reduce the thickness of each ceramic layer disposed between the internal electrodes. However, as the ceramic layers are made thinner, a short circuit between the internal electrodes is more likely to occur. Therefore, there is a demand for a technique capable of suppressing the occurrence of a short circuit between the internal electrodes even if the ceramic layers are made thinner.

In view of the circumstances as described above, it is desirable to provide a multi-layer ceramic capacitor in which a short circuit between internal electrodes is less likely to occur even if an average thickness of ceramic layers is set to 0.4 μm or less.

According to an embodiment of the present invention, there is provided a multi-layer ceramic capacitor including a multi-layer unit and a side margin.
The multi-layer unit includes ceramic layers laminated in a first direction, internal electrodes disposed between the ceramic layers, a main surface oriented in the first direction, a surface layer portion in a range from the main surface to a predetermined depth, and a center portion adjacent to the surface layer portion in the first direction.
The side margin covers the multi-layer unit from a second direction orthogonal to the first direction.
The ceramic layers have an average dimension in the first direction that is 0.4 μm or less.
Each of the internal electrodes includes an oxidized region that is adjacent to the side margin.
The oxidized region in the surface layer portion has a dimension in the second direction that is equal to or more than two times the average dimension of the ceramic layers in the first direction.

In this configuration, the dimension of the oxidized region is increased in the surface layer portion of the multi-layer unit, in which a short circuit between the internal electrodes is likely to occur at an position adjacent to the side margin. This can suppress the occurrence of a short circuit between the internal electrodes even if an average thickness of the ceramic layers is set to 0.4 μm or less.

The predetermined depth may be defined to be 10% of a dimension of the multi-layer unit in the first direction.

In this configuration, the occurrence of a short circuit between the internal electrodes can be more effectively suppressed.

The oxidized region in the center portion may have a dimension in the second direction that is smaller than the oxidized region in the surface layer portion.
The oxidized region in the surface layer portion may have a dimension in the second direction that is equal to or less than four times the average dimension of the ceramic layers in the first direction.

In those configurations, the oxidized regions are kept to be small. Thus, lowering of the capacitance due to the oxidized regions can be suppressed to be small, and the occurrence of a failure in soldering-heat resistance can also be suppressed.

The internal electrodes may include nickel as a main component.

In this configuration, the dimensions of the oxidized regions in the internal electrodes are easily controlled. Thus, the configuration as described above is easily obtained.

It is possible to provide a multi-layer ceramic capacitor in which a short circuit between internal electrodes is less likely to occur even if an average thickness of ceramic layers is set to 0.4 μm or less.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Basic Configuration of Multi-layer Ceramic Capacitor 10

Figure 1:
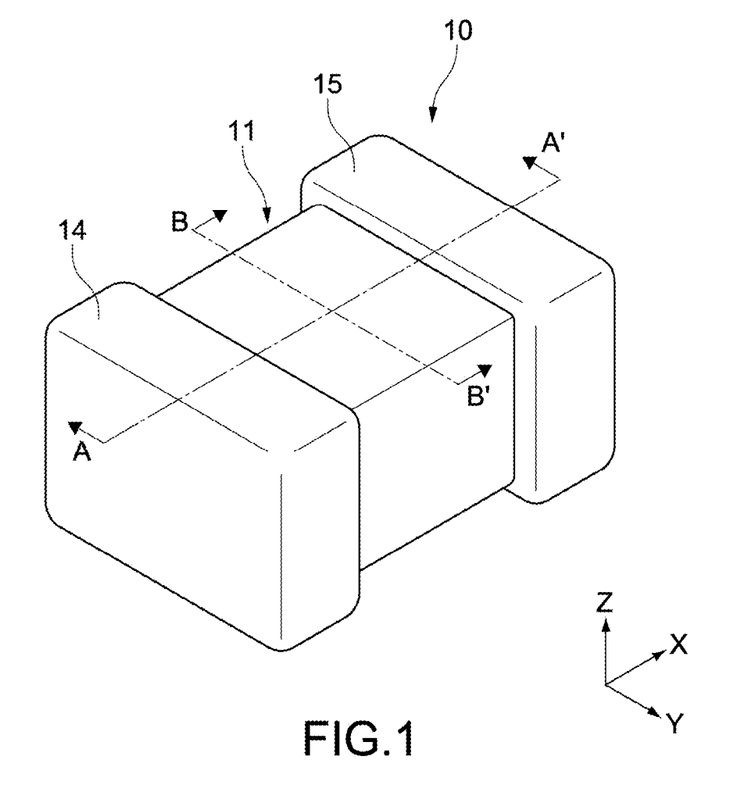
FIG. 1 is a perspective view of a multi-layer ceramic capacitor according to one embodiment of the present invention.
Figure 2:
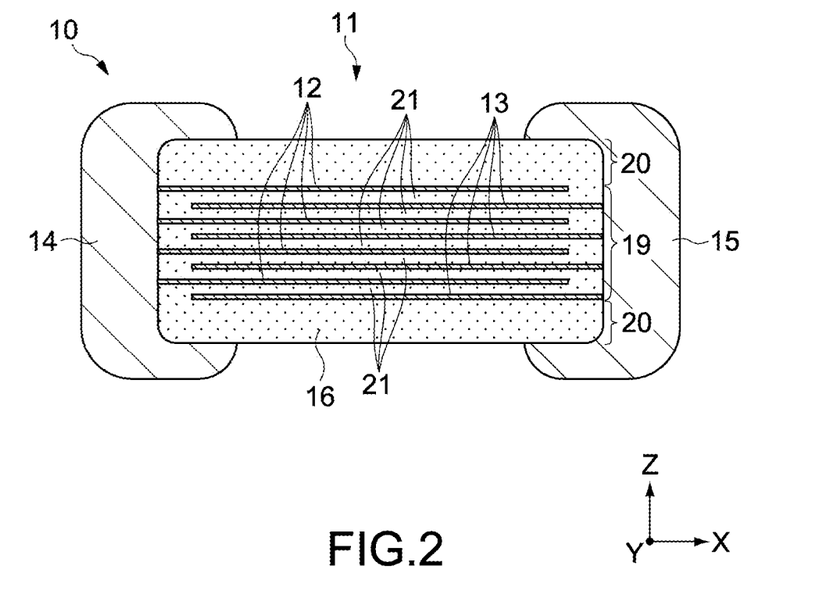
FIG. 2 is a cross-sectional view of the multi-layer ceramic capacitor taken along the A-A' line in FIG. 1.
Figure 3:
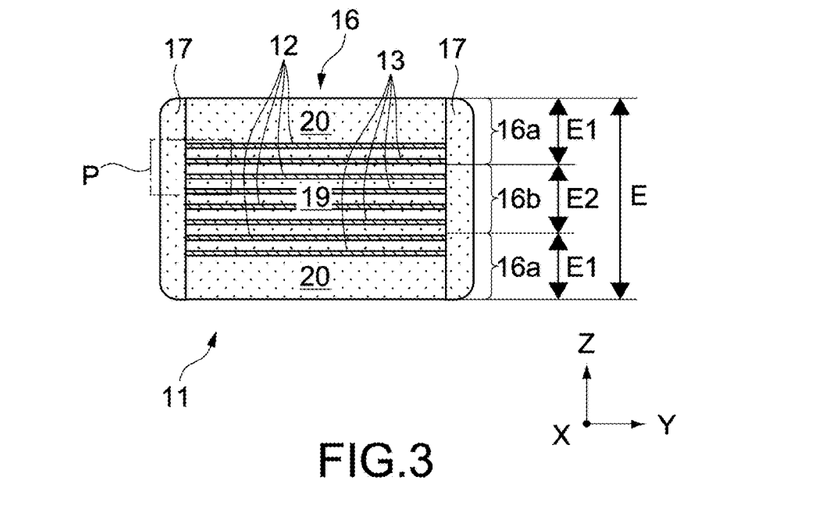
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 has two end surfaces oriented in an X-axis direction, two side surfaces oriented in a Y-axis direction, and two main surfaces oriented in a Z-axis direction. Ridges connecting the respective surfaces of the ceramic body 11 are chamfered.

It should be noted that the form of the ceramic body 11 is not limited to the form as described above. In other words, the ceramic body 11 does not need to have the rectangular form as shown in FIGS. 1 to 3. For example, the surfaces of the ceramic body 11 may be curved surfaces, and the ceramic body 11 may be rounded as a whole.

The first external electrode 14 and the second external electrode 15 cover both the end surfaces of the ceramic body 11 that are oriented in the X-axis direction, and extend to the four surfaces (two main surfaces and two side surfaces) that are connected to both the end surfaces oriented in the X-axis direction. With this configuration, both of the first external electrode 14 and the second external electrode 15 have U-shaped cross sections in parallel with an X-Z plane and an X-Y plane.

The ceramic body 11 includes a multi-layer unit 16 and side margins 17. The side margins 17 cover the entire side surfaces of the multi-layer unit 16 that are oriented in the Y-axis direction. Further, the ceramic body 11 may include bonding units as needed, the bonding units bonding the multi-layer unit 16 and the side margins 17 to each other.

The multi-layer unit 16 includes a capacitance forming unit 19 and covers 20. The covers 20 respectively cover the upper and lower surfaces of the capacitance forming unit 19, the upper and lower surfaces being disposed in the Z-axis direction. The capacitance forming unit 19 includes a plurality of ceramic layers 21, a plurality of first internal electrodes 12, and a plurality of second internal electrodes 13. The covers 20 are not provided with the first internal electrodes 12 and the second internal electrodes 13.

The first internal electrodes 12 and the second internal electrodes 13 are alternately disposed along the Z-axis direction between the ceramic layers 21 laminated in the Z-axis direction. The first internal electrodes 12 are connected to the first external electrode 14 and are separated from the second external electrode 15. The second internal electrodes 13 are connected to the second external electrode 15 and are separated from the first external electrode 14.

Typically, the first internal electrodes 12 and the second internal electrodes 13 are mainly made of nickel (Ni) and function as internal electrodes of the multi-layer ceramic capacitor 10. It should be noted that the first internal electrodes 12 and the second internal electrodes 13 may contain at least one of copper (Cu), silver (Ag), and palladium (Pd) other than nickel, as a main component.

In such a manner, in the ceramic body 11, except for both the end surfaces, which are oriented in the X-axis direction and to which the first external electrode 14 and the second external electrode 15 are provided, the surfaces of the capacitance forming unit 19 are covered with the side margins 17 and the covers 20. The side margins 17 and the covers 20 have main functions of protecting the periphery of the capacitance forming unit 19 and ensuring insulation properties of the first internal electrodes 12 and the second internal electrodes 13.

The ceramic layers 21 disposed between the first internal electrodes 12 and the second internal electrodes 13 in the capacitance forming unit 19 are made of dielectric ceramics. In the multi-layer ceramic capacitor 10, in order to increase the capacitance in the capacitance forming unit 19, dielectric ceramics having a high dielectric constant is used as the dielectric ceramics forming the ceramic layers 21.

More specifically, in the multi-layer ceramic capacitor 10, polycrystal of a barium titanate ($BaTiO_3$) based material, i.e., polycrystal having a Perovskite structure containing barium (Ba) and titanium (Ti) is used as the dielectric ceramics having a high dielectric constant that forms the ceramic layers 21. This provides a large capacitance to the multi-layer ceramic capacitor 10.

It should be noted that the ceramic layers 21 may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The side margins 17 and the covers 20 are also made of dielectric ceramics. Although a material forming the side margins 17 and the covers 20 can be insulating ceramics, use of dielectric ceramics similar to that of the ceramic layers 21 leads to suppression of internal stress in the ceramic body 11.

With the configuration described above, when a voltage is applied between the first external electrode 14 and the second external electrode 15 in the multi-layer ceramic capacitor 10, the voltage is applied to the plurality of ceramic layers 21 between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the basic configuration of the multi-layer ceramic capacitor 10 according to this embodiment is not limited to that shown in FIGS. 1 to 3 and can be changed as appropriate. For example, the number of first internal electrodes 12 and second internal electrodes 13 and the thickness of each ceramic layer 21 can be determined as appropriate according to the size and performance expected for the multi-layer ceramic capacitor 10.

2. Detailed Configuration of Multi-layer Ceramic Capacitor 10

In the multi-layer ceramic capacitor 10, the ceramic layers 21 forming the multi-layer unit 16 are very thin. Specifically, an average thickness T (see FIG. 5), which is an average dimension of the ceramic layers 21 in the Z-axis direction, is 0.4 μm or less. In the multi-layer ceramic capacitor 10, reduction in the thickness of the ceramic layer 21 results in advantage for increase in capacitance, miniaturization, and low profile.

The average thickness T of the ceramic layers 21 can be calculated as an average value of the thickness measured at a plurality of spots of the ceramic layers 21. The positions or numbers at which the thickness of each ceramic layer 21 is measured can be arbitrarily determined. Hereinafter, an example of a method of measuring the average thickness T of the ceramic layers 21 will be described with reference to FIG. 4.

Figure 4:
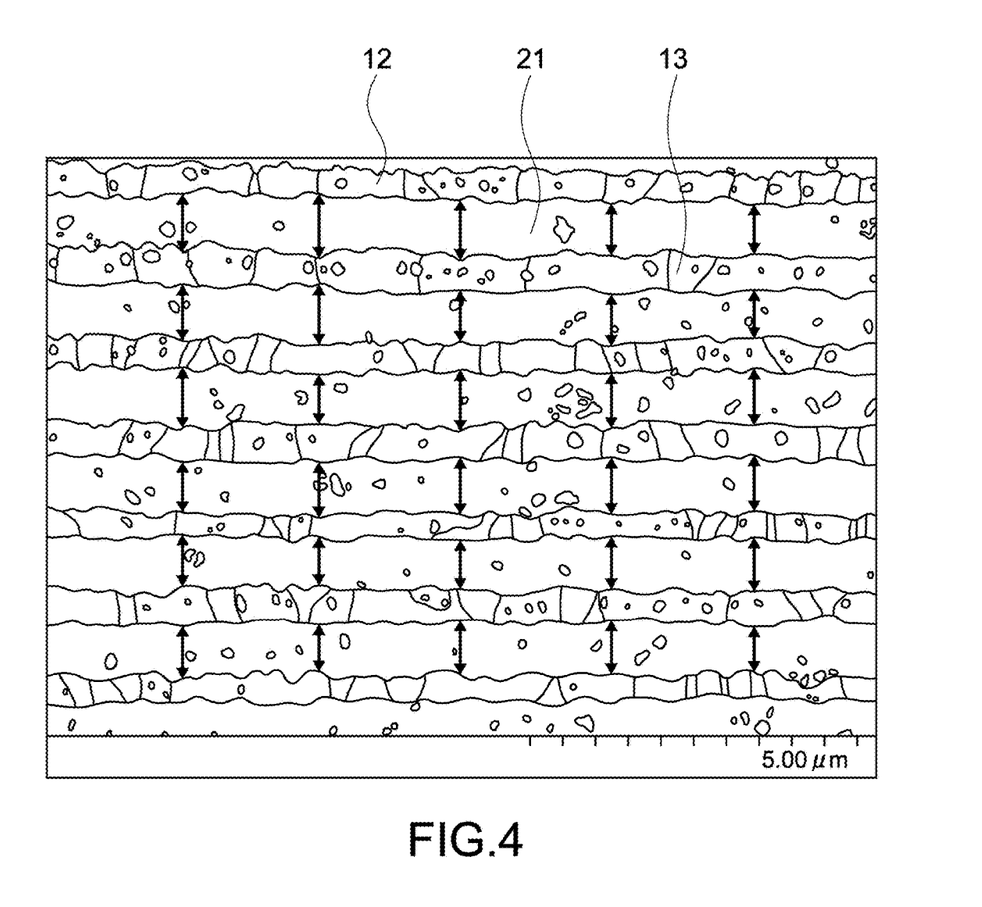
FIG. 4 is a diagram showing a microstructure of a cross section of the multi-layer ceramic capacitor.

FIG. 4 is a diagram showing a microstructure of a cross section of the ceramic body 11, which is observed with a scanning electron microscope in the visual field of 12.6 μm×8.35 μm. For the six ceramic layers 21 within the visual field, the thickness of each ceramic layer is measured at five spots indicated by arrows at regular intervals of 2 μm. Subsequently, an average value of the thicknesses obtained at the thirty spots can be set as the average thickness T.

In the method of producing the multi-layer ceramic capacitor 10, the side margins 17 are provided to the side surfaces of the multi-layer unit 16 in a subsequent step. Use of this production method is likely to cause a short circuit between the first internal electrodes 12 and the second internal electrodes 13 in the vicinity of the side surfaces of the multi-layer unit 16. This will be described in detail in the section "Method of Producing Multi-layer Ceramic Capacitor 10".

In the multi-layer ceramic capacitor 10, the ceramic layers 21 are very thin as described above, and thus a distance between the first internal electrode 12 and the second internal electrode 13 adjacent to each other in the Z-axis direction is short. As a result, in the multi-layer ceramic capacitor 10, because of the ceramic layers 21 with a very thin configuration, a short circuit between the first internal electrodes 12 and the second internal electrodes 13 is further likely to occur in the vicinity of the side surfaces of the multi-layer unit 16.

Meanwhile, the multi-layer ceramic capacitor 10 according to this embodiment has a configuration capable of suppressing the occurrence of a short circuit between the first internal electrodes 12 and the second internal electrodes 13 in the vicinity of the side surfaces of the multi-layer unit 16 even if the production method of providing the side margins 17 in a subsequent step is used and the ceramic layers 21 are made very thin. Hereinafter, details of this configuration will be described.

Figure 5:
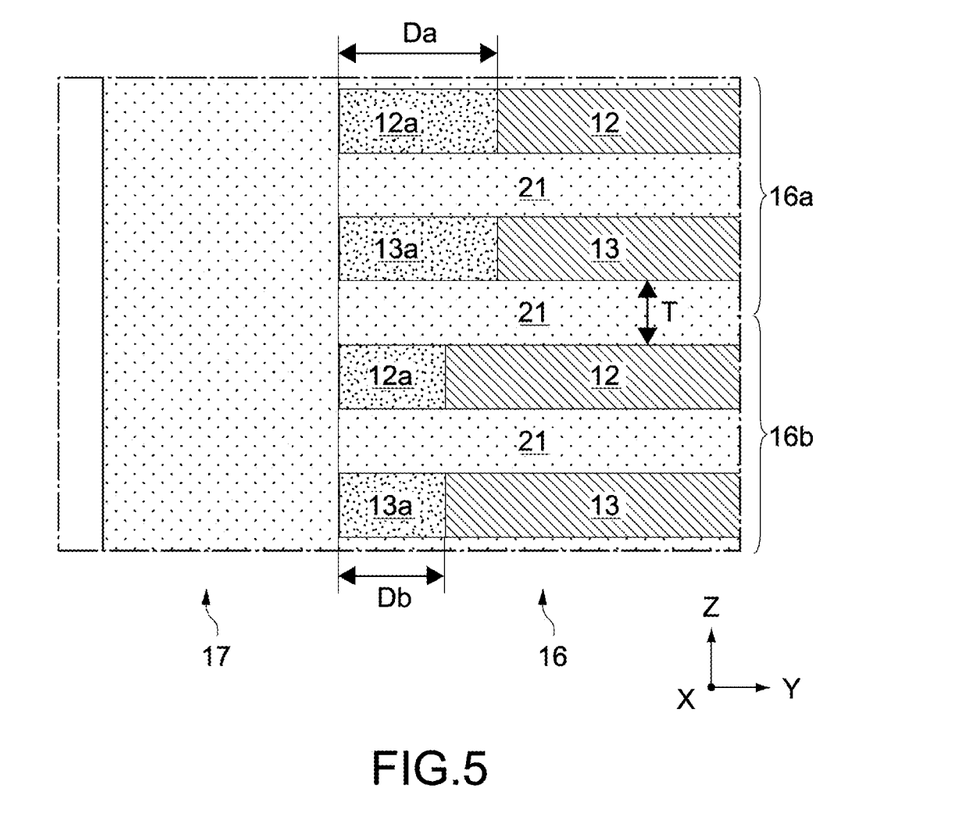
FIG. 5 is an enlarged partial cross-sectional view of a region P of the multi-layer ceramic capacitor shown in FIG. 3.

FIG. 5 is an enlarged partial cross-sectional view of a region P of the multi-layer ceramic capacitor 10, which is surrounded by a chain line of FIG. 3. The first internal electrode 12 and the second internal electrode 13 include an oxidized region 12a and an oxidized region 13a, respectively, at end portions in the Y-axis direction, the end portions being in the vicinity of the side surface of the multi-layer unit 16. The oxidized regions 12a and 13a have no electrical conductivity. The oxidized regions 12a and 13a are made of an oxide containing a metal material forming the first internal electrodes 12 and the second internal electrodes 13.

Therefore, in the multi-layer ceramic capacitor 10, even if the oxidized regions 12a and 13a adjacent to each other are in contact, the first internal electrodes 12 and the second internal electrodes 13 are not electrically connected to each other. As a result, in the multi-layer ceramic capacitor 10, the occurrence of a short circuit between the first internal electrodes 12 and the second internal electrodes 13 in the vicinity of the side surfaces of the multi-layer unit 16 can be effectively suppressed.

Here, it is assumed that the multi-layer unit 16 is divided into three parts in the Z-axis direction. In other words, as shown in FIG. 3, it is assumed that the multi-layer unit 16 includes two surface layer portions 16a and a center portion 16b. The two surface layer portions 16a are in the ranges from the respective main surfaces oriented in the Z-axis direction to a predetermined depth. The center portion 16b is disposed between the two surface layer portions 16a.

FIG. 3 shows a dimension E of the multi-layer unit 16 in the Z-axis direction, a dimension E1 of the surface layer portion 16a in the Z-axis direction, and a dimension E2 of the center portion 16b in the Z-axis direction. The dimension E of the multi-layer unit 16 is the sum of the dimensions E1 of the surface layer portions 16a and the dimension E2 of the center portion 16b. In other words, the following equation is established: E=E1+E2+E1.

The dimension E1 of each of the surface layer portions 16a can be arbitrarily determined, but it is desirable to define the dimension E1 to be 10% of the dimension E of the multi-layer unit 16. It should be noted that in FIG. 3, for the purpose of description, the ratio of the dimensions E1 and E2 in the multi-layer unit 16 is not correctly shown, that is, the dimensions E1 of the surface layer portions 16a are shown to be large relative to the dimension E2 of the center portion 16b.

When the average thickness T of the ceramic layers 21 has a normal size (for example, approximately 1 μm), dimensions Da and Db of the oxidized regions 12a and 13a in the Y-axis direction are set to be nearly equal to the average thickness T of the ceramic layers 21. However, it was confirmed that, when the average thickness T of the ceramic layers 21 is set to 0.4 μm or less in a design similar to the above, a short circuit between the first internal electrodes 12 and the second internal electrodes 13 is likely to occur in the surface layer portions 16a.

Therefore, in the configuration where the average thickness T of the ceramic layers 21 is 0.4 μm or less, it is necessary to employ a design that is different from the configuration where the average thickness T of the ceramic layers 21 has a normal size. In this regard, in the present invention, it is found out that increasing the dimensions Da of the oxidized regions 12a and 13a in the Y-axis direction in the surface layer portions 16a is effective.

More specifically, as shown in FIG. 5, in the multi-layer ceramic capacitor 10, the dimensions Da of the oxidized regions 12a and 13a in the Y-axis direction surface in the layer portion 16a are set to be equal to or more than two times the average thickness T of the ceramic layers 21. This allows a short circuit between the first internal electrodes 12 and the second internal electrodes 13 in the surface layer portion 16a to be less likely to occur in the configuration where the average thickness T of the ceramic layers 21 is 0.4 μm or less.

Meanwhile, since the oxidized regions 12a and 13a do not function as electrodes, as the oxidized regions 12a and 13a become larger, the capacitance of the multi-layer ceramic capacitor 10 decreases. As a result, the dimensions Da of the oxidized regions 12a and 13a in the layer portion 16a are desirably kept to be small within the range capable of suppressing the occurrence of a short circuit between the first internal electrodes 12 and the second internal electrodes 13.

Further, the oxidized regions 12a and 13a are formed by oxidizing the end portions of the first internal electrodes 12 and the second internal electrodes 13 in the Y-axis direction at the time of sintering. The formation of the oxidized regions 12a and 13a at the time of sintering involves volume expansion. As a result, as the dimensions Da of the oxidized regions 12a and 13a become larger, internal stress in the ceramic body 11 increases.

In the multi-layer ceramic capacitor 10, as the internal stress in the ceramic body 11 becomes larger, a failure in heat resistance (failure in soldering-heat resistance) at the time of soldering becomes more likely to occur, that is, a crack becomes more likely to occur at the time of mounting. From this viewpoint as well, the dimensions Da of the oxidized regions 12a and 13a in the layer portion 16a are desirably kept to be small.

As a result, the dimensions Da of the oxidized regions 12a and 13a in the layer portions 16a are desirably kept to be equal to or less than four times the average thickness T of the ceramic layers 21. With this configuration, the multi-layer ceramic capacitor 10 can ensure a large capacitance and also suppress the occurrence of a failure in soldering-heat resistance at the time of mounting.

It should be noted that almost the whole of the outermost first and second internal electrodes 12 and 13 that are adjacent to the respective covers 20 are oxidized by oxygen supplied via the covers 20 at the time of sintering, and those first and second internal electrodes 12 and 13 no longer function as electrodes in some cases. In such a case, the outermost first and second internal electrodes 12 and 13 are considered to be extinguished, and only the oxidized regions 12a and 13a of the first and second internal electrodes 12 and 13 excluding the outermost ones are taken into account.

Further, in the center portion 16b where a short circuit between the first internal electrodes 12 and the second internal electrodes 13 is less likely to occur than in the surface layer portions 16a, the dimensions Db of the oxidized regions 12a and 13a in the Y-axis direction may be less than two times the average thickness T of the ceramic layers 21. This can suppress the lowering of the capacitance of the multi-layer ceramic capacitor 10 and the occurrence of failure in soldering-heat resistance.

Furthermore, the end portions of the oxidized regions 12a and 13a on the side margin 17 side are often shifted by approximately ±0.1 μm in the Y-axis direction in the production process (cutting step (Step S03), sintering step (Step S04), and the like that will be described later). In this case, the dimensions Da and Db of the oxidized regions 12a and 13a are measured with reference to the shifted positions.

3. Method of Producing Multi-layer Ceramic Capacitor 10

Figure 6:
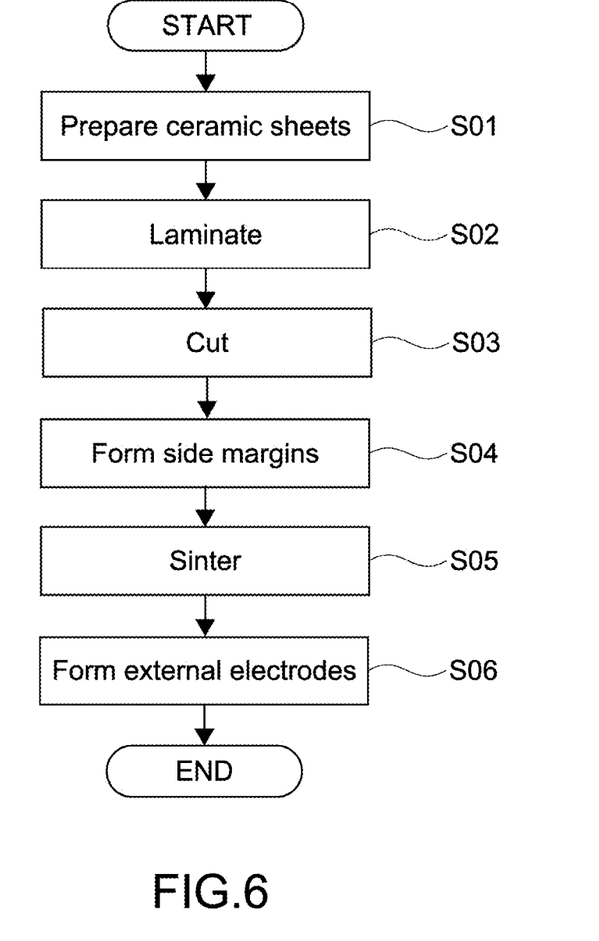
FIG. 6 is a flowchart showing a method of producing the multi-layer ceramic capacitor.

FIG. 6 is a flowchart showing a method of producing the multi-layer ceramic capacitor 10. FIGS. 7A to 13 are views each showing a production process of the multi-layer ceramic capacitor 10. Hereinafter, the method of producing the multi-layer ceramic capacitor 10 will be described along FIG. 6 with reference to FIGS. 7A to 13 as appropriate.

3.1 Step S01: Preparation of Ceramic Sheets

In Step S01, first ceramic sheets 101 and second ceramic sheets 102 for forming the capacitance forming unit 19, and third ceramic sheets 103 for forming the covers 20 are prepared. The first, second, and third ceramic sheets 101, 102, and 103 are formed as unsintered dielectric green sheets mainly containing dielectric ceramics.

The first, second, and third ceramic sheets 101, 102, and 103 are formed into sheets by using a roll coater or a doctor blade, for example. The thickness of each of the first and second ceramic sheets 101 and 102 is adjusted such that the average thickness T of the ceramic layers 21 in the sintered capacitance forming unit 19 is 0.4 μm or less. The thickness of the third ceramic sheet 103 can be adjusted as appropriate.

Figure 7A:
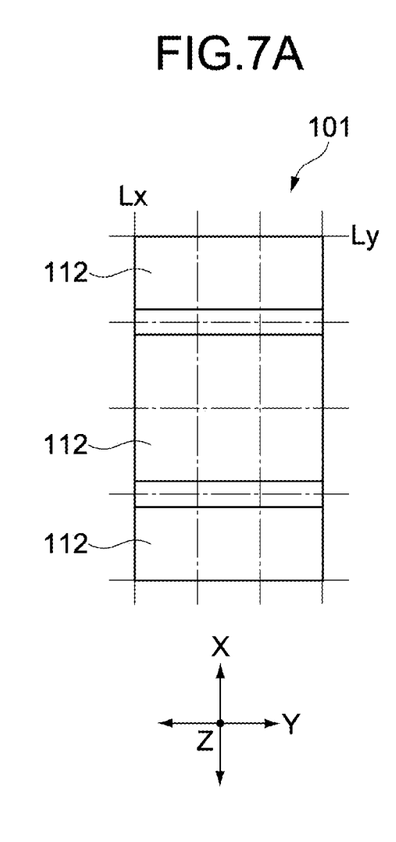
FIG. 7A is a plan view showing a production process of the multi-layer ceramic capacitor.
Figure 7B:
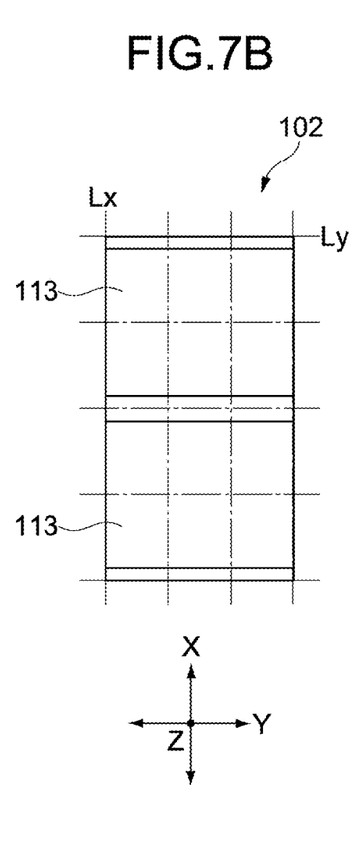
FIG. 7B is a plan view showing the production process of the multi-layer ceramic capacitor.
Figure 7C:
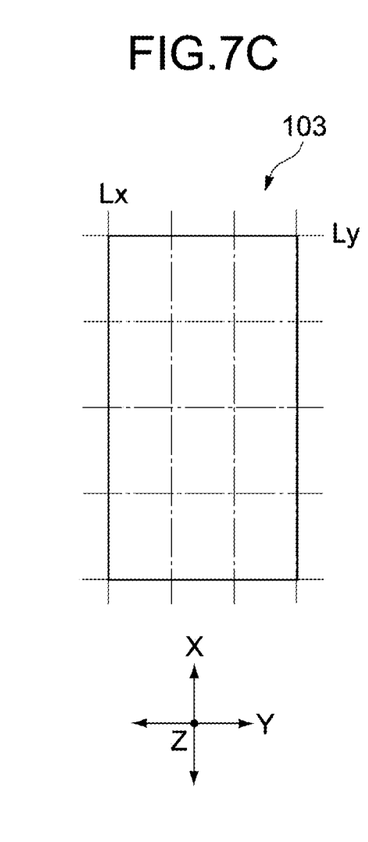
FIG. 7C is a plan view showing the production process of the multi-layer ceramic capacitor.

FIGS. 7A, 7B, and 7C are plan views of the first, second, and third ceramic sheets 101, 102, and 103, respectively. At this stage, the first, second, and third ceramic sheets 101, 102, and 103 are each formed into a large-sized sheet that is not singulated. FIGS. 7A, 7B, and 7C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 7A, 7B, and 7C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheets 103 corresponding to the covers 20.

The first and second internal electrodes 112 and 113 can be formed by applying an arbitrary electrically conductive paste to the first and second ceramic sheets 101 and 102. A method of applying an electrically conductive paste can be arbitrarily selected from well-known techniques. For example, for the application of an electrically conductive paste, a screen printing method or a gravure printing method can be used.

In the first and second internal electrodes 112 and 113, gaps are disposed along the cutting lines Ly in the X-axis direction for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

3.2 Step S02: Lamination

Figure 8:
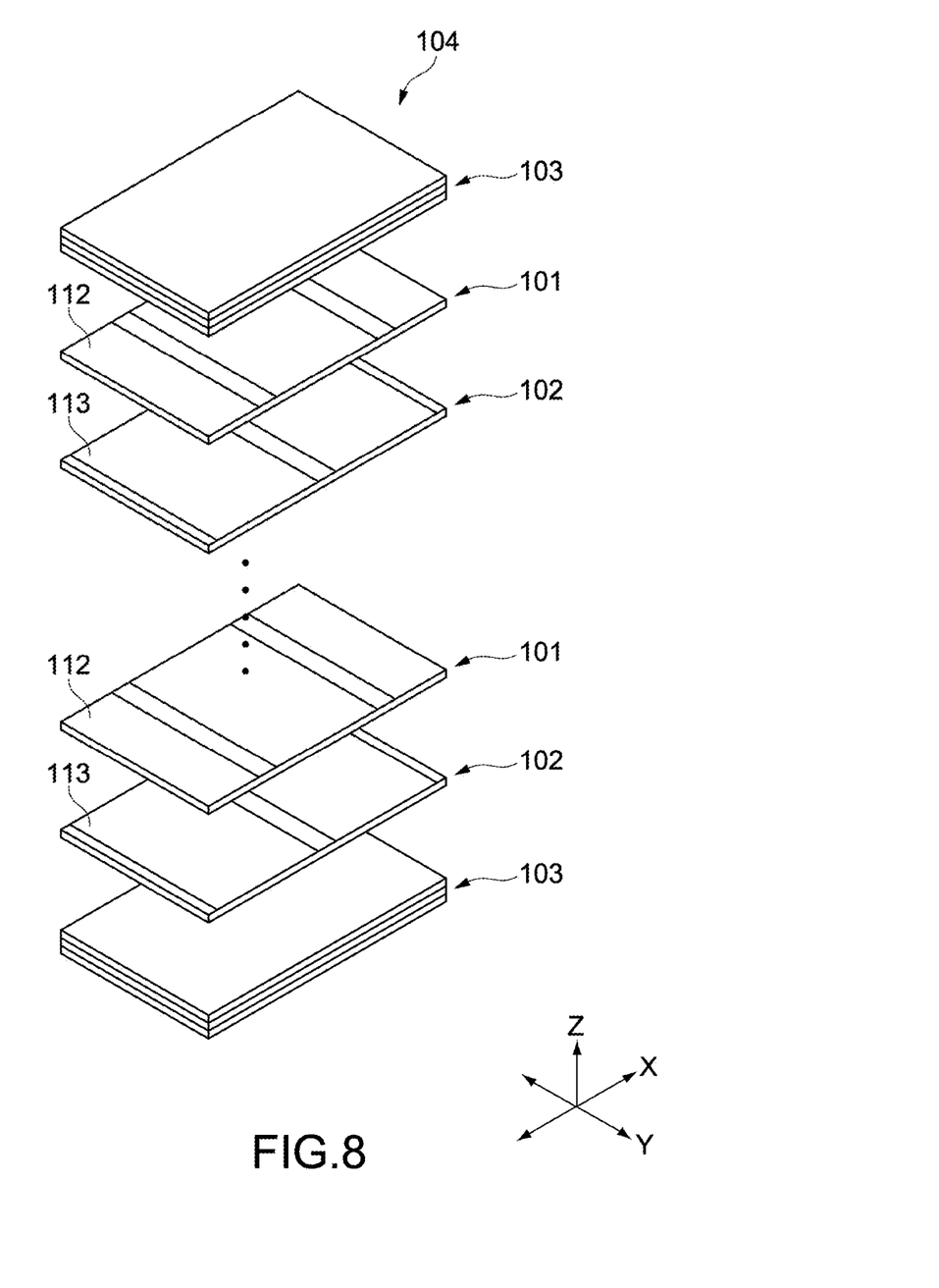
FIG. 8 is a perspective view showing the production process of the multi-layer ceramic capacitor.

In Step S02, the first, second, and third ceramic sheets 101, 102, and 103 prepared in Step S01 are laminated as shown in FIG. 8, to produce a multi-layer sheet 104. In the multi-layer sheet 104, the first ceramic sheets 101 and the second ceramic sheets 102 that correspond to the capacitance forming unit 19 are alternately laminated in the Z-axis direction.

Further, in the multi-layer sheet 104, the third ceramic sheets 103 corresponding to the covers 20 are laminated on the uppermost and lowermost surfaces of the first and second ceramic sheets 101 and 102 alternately laminated in the Z-axis direction. It should be noted that in the example shown in FIG. 8, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is desirably used. With this configuration, a high-density multi-layer sheet 104 can be obtained.

3.3 Step S03: Cutting

Figure 9:
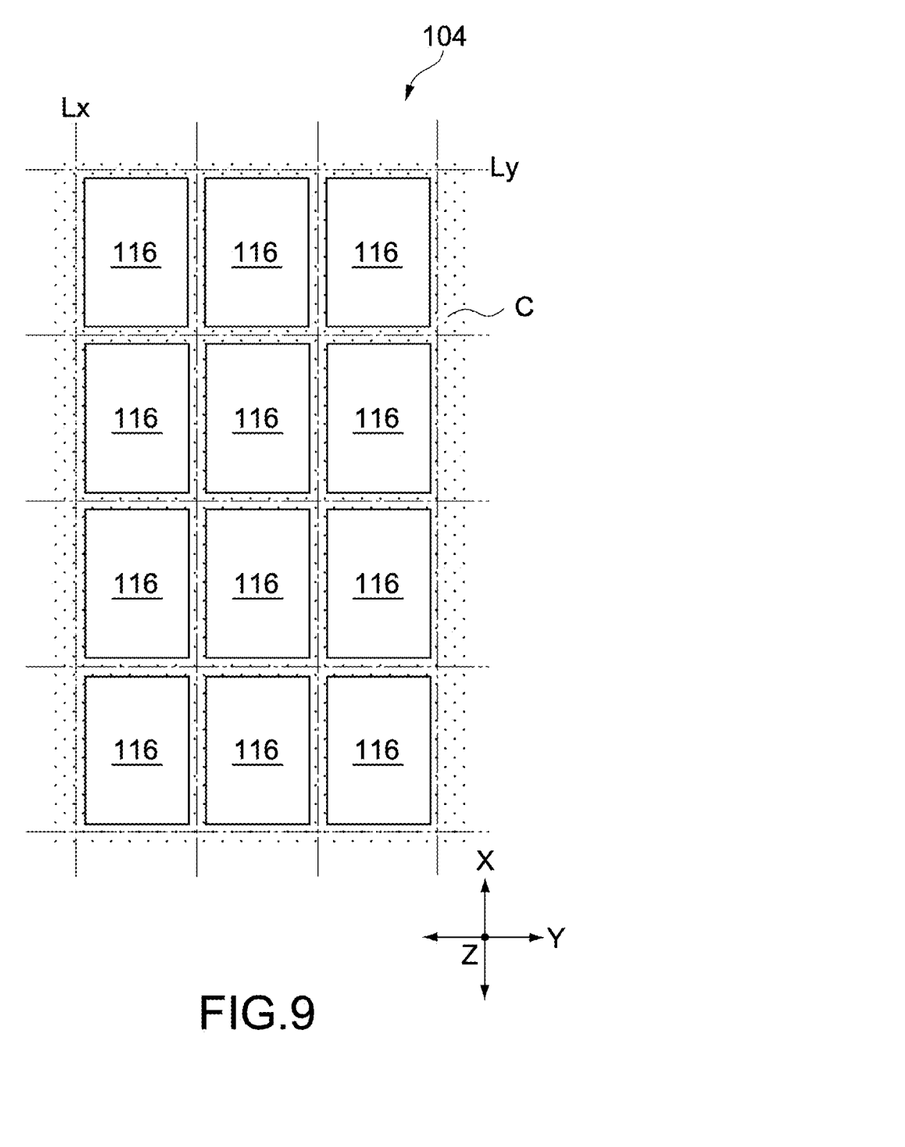
FIG. 9 is a plan view showing the production process of the multi-layer ceramic capacitor.

In Step S03, the multi-layer sheet 104 obtained in Step S02 is cut along the cutting lines Lx and Ly as shown in FIG. 9, to produce unsintered multi-layer chips 116. Each of the multi-layer chips 116 corresponds to a multi-layer unit 16 after sintering. The multi-layer sheet 104 is cut with a push-cutting blade, a rotary blade, or the like.

More specifically, the multi-layer sheet 104 is cut along the cutting lines Lx and Ly while being held by a holding member C. As a result, the multi-layer sheet 104 is singulated, so that the multi-layer chips 116 are obtained. At that time, the holding member C is not cut, and thus the multi-layer chips 116 are connected via the holding member C.

Figure 10:
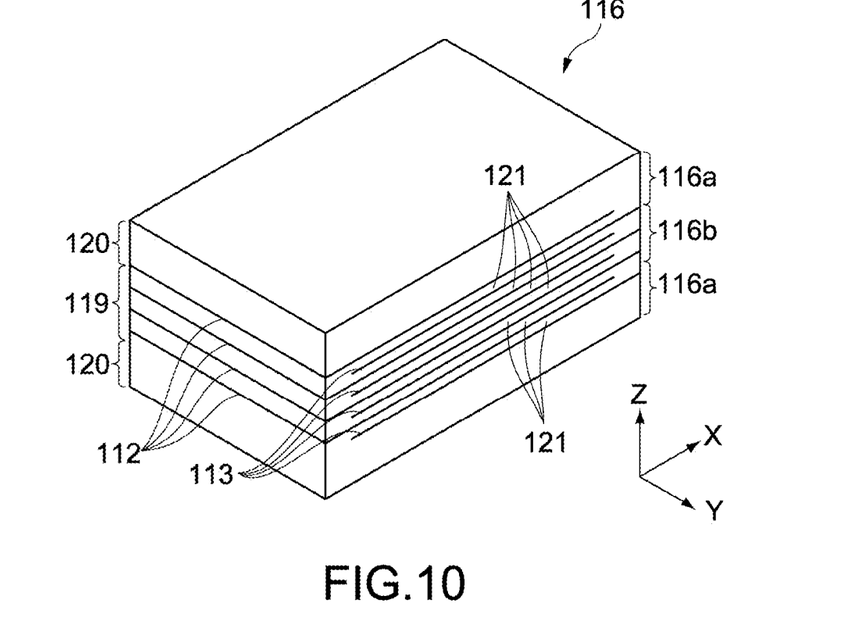
FIG. 10 is a perspective view showing the production process of the multi-layer ceramic capacitor.

FIG. 10 is a perspective view of the multi-layer chip 116 obtained in Step S03. The multi-layer chip 116 includes a capacitance forming unit 119 and covers 120. In the multi-layer chip 116, the first and second internal electrodes 112 and 113 are exposed to the cut surfaces, i.e., both the side surfaces of the multi-layer chip 116. Ceramic layers 121 are formed between the first and second internal electrodes 112 and 113.

Figure 11:
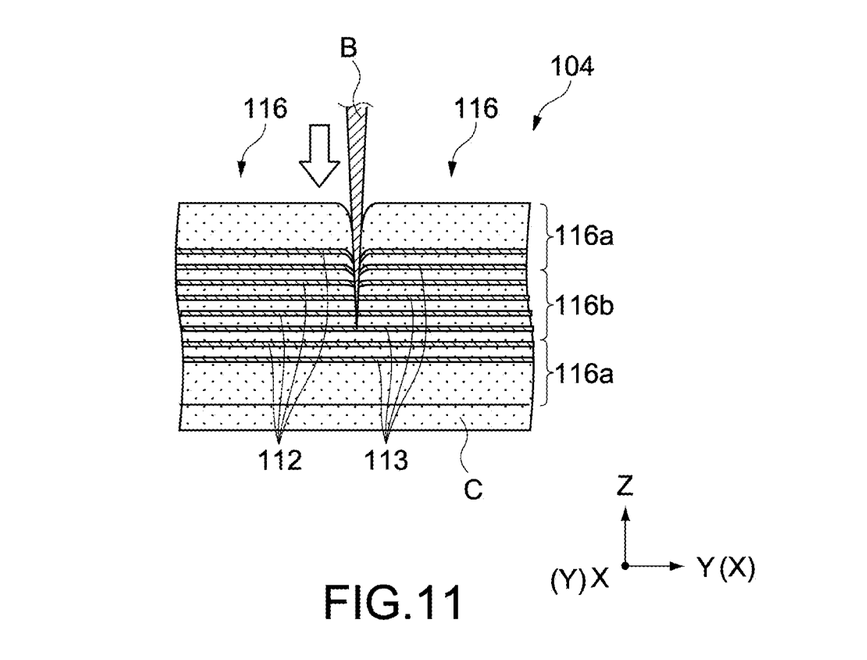
FIG. 11 is a partial cross-sectional view showing the production process of the multi-layer ceramic capacitor.

FIG. 11 is a partial cross-sectional view of the multi-layer sheet 104, exemplifying the process of Step S03. In the example of FIG. 11, the multi-layer sheet 104 is cut along the cutting lines Lx and Ly by using a push-cutting blade B. FIG. 11 shows a state where the multi-layer sheet 104 is being cut with the push-cutting blade B.

More specifically, in the example of FIG. 11, a pressing force is applied to the push-cutting blade B, which is disposed along the cutting lines Lx and Ly, and the tip of the push-cutting blade B is thus moved from the upper surface of the multi-layer sheet 104 in the Z-axis direction until the tip reaches the holding member C. In such a manner, the multi-layer sheet 104 is cut into the multi-layer chips 116.

In the process in which the tip of the push-cutting blade B reaches the holding member C from the upper surface of the multi-layer sheet 104 in the Z-axis direction, a downward force in the Z-axis direction is applied from the push-cutting blade B to the cut surfaces of the multi-layer sheet 104. This causes a downward deformation in the Z-axis direction in the vicinity of the cut surfaces of the multi-layer sheet 104. This deformation is more likely to occur in an upper region of the multi-layer sheet 104 in the Z-axis direction.

As a result, in the first and second internal electrodes 112 and 113 of the multi-layer chips 116 obtained by singulation, a deformation curved downward in the Z-axis direction occurs in the vicinity of the side surfaces. This deformation of the first and second internal electrodes 112 and 113 is likely to occur in the upper surface layer portion 116a in the Z-axis direction and hardly occurs in the center portion 116b and the lower surface layer portion 116a in the Z-axis direction.

Therefore, in the upper surface layer portion 116a in the Z-axis direction, the first and second internal electrodes 112 and 113 easily come into contact with each other in the vicinity of the side surfaces. However, even if the first and second internal electrodes 112 and 113 come into contact with each other in this step, the suitable oxidized regions 12a and 13a are formed in Step S05 (sintering) that will be described later. Thus, the first and second internal electrodes 12 and 13 obtained after subjected to sintering do not cause a short circuit.

3.4 Step S04: Formation of Side Margins

Figure 12:
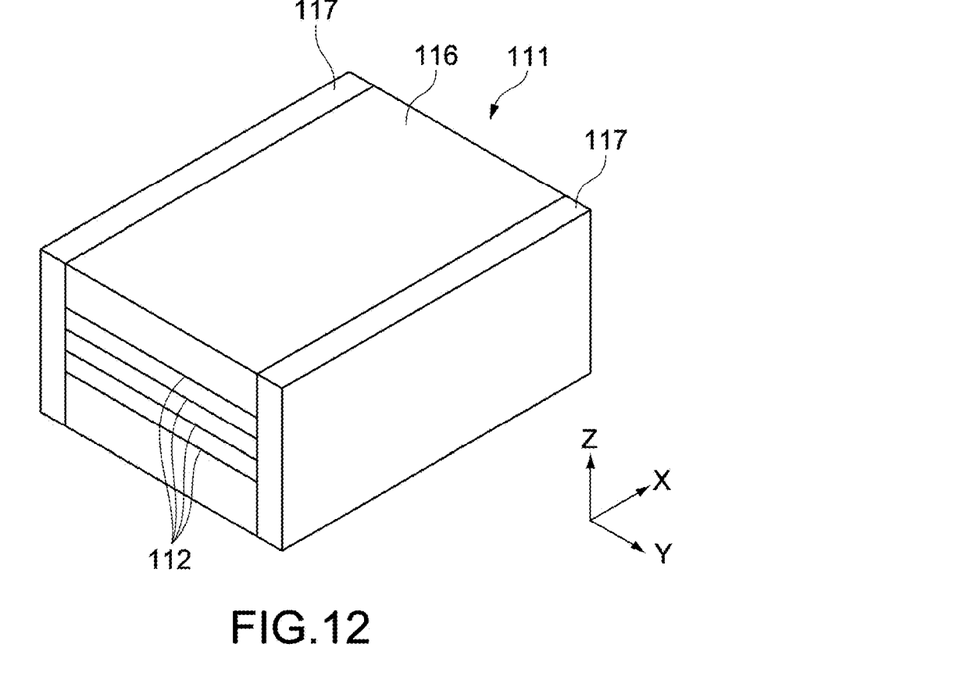
FIG. 12 is a perspective view showing the production process of the multi-layer ceramic capacitor.

In Step S04, unsintered side margins 117 are provided to the side surfaces of the multi-layer chip 116 obtained in Step S03, from which the first and second internal electrodes 112 and 113 are exposed, and an unsintered ceramic body 111 shown in FIG. 12 is thus produced. The side margins 117 are made of ceramic sheets or ceramic slurry.

In Step S04, the side margins 117 are provided to both the side surfaces, which are the cut surfaces of the multi-layer chip 116 in Step S03. For that reason, in Step S04, it is desirable to previously detach the multi-layer chips 116 from the holding member C and rotate the multi-layer chips 116 by 90 degrees.

The side margins 117 can be formed by, for example, attaching ceramic sheets to the side surfaces of the multi-layer chip 116. Alternately, the side margins 117 can also be formed by coating the side surfaces of the multi-layer chip 116 with ceramic slurry through application or dipping, for example.

In the multi-layer chip 116 before subjected to this step, the first and second internal electrodes 112 and 113 are connected to each other in the side surfaces in some cases. For example, the first and second internal electrodes 112 and 113 may be connected to each other via foreign substances that adhere to the side surfaces of the multi-layer chip 116. Further, the first and second internal electrodes 112 and 113 may be spread on the cut surfaces in Step S03 (cutting) and directly connected to each other.

In such a case, the side margins 117 are provided in a state where the first and second internal electrodes 112 and 113 are connected to each other in the side surfaces of the multi-layer chip 116. However, even if the first and second internal electrodes 112 and 113 are connected to each other in this step, the suitable oxidized regions 12a and 13a are formed in Step S05 (sintering) that will be described later. Thus, the first and second internal electrodes 12 and 13 obtained after subjected to sintering do not cause a short circuit.

3.5 Step S05: Sintering

In Step S05, the unsintered ceramic body 111 obtained in Step S04 is sintered to produce the ceramic body 11 of the multi-layer ceramic capacitor 10 shown in FIGS. 1 to 3. In other words, in Step S05, the multi-layer chip 116 becomes the multi-layer unit 16, and the side margins 117 become the side margins 17.

A sintering temperature in Step S05 can be determined on the basis of a sintering temperature for the ceramic body 111. For example, when a barium titanate based material is used as dielectric ceramics, the sintering temperature can be set to approximately 1,000 to 1,300° C. Further, sintering can be performed in a reduction atmosphere or a low-oxygen partial pressure atmosphere, for example.

At the time of sintering, sintering behavior is different between the multi-layer chip 116 and the side margins 117. Thus, stress is applied from the side margins 117 to the side surfaces of the multi-layer chip 116. This stress concentrates particularly on the upper and lower surface layer portions 116a in the Z-axis direction. As a result, the first and second internal electrodes 112 and 113 disposed in the surface layer portions 116a may be deformed in the vicinity of the side surfaces.

In such a case, the first and second internal electrodes 112 and 113 may come into contact with each other during sintering. However, even if the first and second internal electrodes 112 and 113 come into contact with each other, the oxidized regions 12a and 13a are respectively formed in the first internal electrodes 112 and the second internal electrodes 113 as will be described later. Thus, the first and second internal electrodes 12 and 13 obtained after subjected to sintering do not cause a short circuit.

Figure 13:
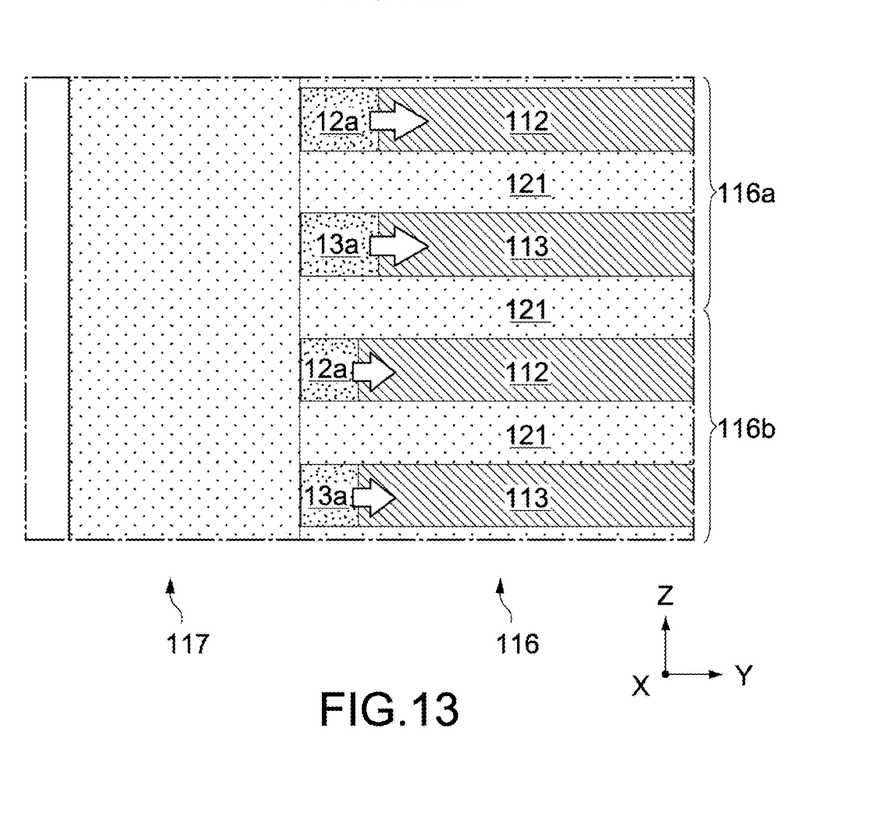
FIG. 13 is a partial cross-sectional view showing the production process of the multi-layer ceramic capacitor.

FIG. 13 is a partial cross-sectional view of the ceramic body 111, showing the process of sintering. At the time of sintering of the ceramic body 111, oxygen is supplied from the outside of the ceramic body 111 to the end portions of the first and second internal electrodes 112 and 113 in the Y-axis direction. This allows generation of an oxide containing a metal material that forms the first and second internal electrodes 112 and 113, so that the oxidized regions 12a and 13a are formed.

The oxidized regions 12a and 13a grow toward the center portion in the Y-axis direction during sintering. In other words, adjusting the amount of growth of the oxidized regions 12a and 13a during sintering allows the dimensions Da and Db of the oxidized regions 12a and 13a to be controlled. For control of the dimensions Da and Db of the oxidized regions 12a and 13a, various methods can be used.

For example, the dimensions Da and Db of the oxidized regions 12a and 13a can be controlled by the thickness of the side margin 117. In this method, the adjustment of the thickness of the side margin 117 allows the amount of oxygen to be controlled, the oxygen being supplied from the outside to the end portions of the first and second internal electrodes 112 and 113 in the Y-axis direction via the side margins 117.

In other words, as the side margin 117 is made thinner, the supply amount of oxygen becomes larger. Thus, the dimensions Da and Db of the oxidized regions 12a and 13a can be increased. Conversely, as the side margin 117 is made thicker, the supply amount of oxygen becomes smaller. Thus, the dimensions Da and Db of the oxidized regions 12a and 13a can be reduced.

Further, the dimensions Da and Db of the oxidized regions 12a and 13a can also be controlled by the composition of the side margin 117. For example, when the first and second internal electrodes 112 and 113 are formed of an electrically conductive paste mainly containing nickel, the content of magnesium (Mg) in the side margin 117 can be adjusted.

In the configuration in which the side margin 117 contains magnesium, the magnesium of the side margin 117 is supplied to the end portions of the first and second internal electrodes 112 and 113 in the Y-axis direction at the time of sintering. This allows the oxidized regions 12a and 13a to be formed at the end portions of the first and second internal electrodes 112 and 113 in the Y-axis direction while nickel is taking in magnesium and oxygen.

Therefore, as the content of magnesium in the side margin 117 is increased, the supply amount of magnesium is increased, and the dimensions Da and Db of the oxidized regions 12a and 13a can be increased. Conversely, as the content of magnesium in the side margin 117 is reduced, the supply amount of magnesium is reduced, and the dimensions Da and Db of the oxidized regions 12a and 13a can be reduced.

Further, in order to increase only the dimensions Da of the oxidized regions 12a and 13a disposed in the surface layer portions 16a while keeping the dimensions Db of the oxidized regions 12a and 13a disposed in the center portion 16b to be small, for example, it is effective to reduce the thickness of each cover 120, chamfer the ceramic body 111, and increase the content of magnesium in the covers 120.

In other words, reduction in the thickness of each cover 120 leads to increase in the amount of oxygen supplied from the outside to the first and second internal electrodes 112 and 113 via the covers 120. The oxygen supplied to the first and second internal electrodes 112 and 113 via the covers 120 easily reaches the surface layer portions 116a, but has difficulty in reaching the center portion 116b.

Therefore, the reduction in thickness of each cover 120 enables oxygen to be selectively supplied to the end portions of the first and second internal electrodes 112 and 113 in the Y-axis direction, the first and second internal electrodes 112 and 113 being disposed in the surface layer portions 116a. This enables only the dimensions Da of the oxidized regions 12a and 13a to be increased, the oxidized regions 12a and 13a being disposed in the surface layer portions 16a.

Further, by chamfering of the unsintered ceramic body 111 by barrel polishing or the like, the ridges connecting the covers 120 and the side margins 117 can be made thin. This can also increase the amount of oxygen supplied to the end portions of the first and second internal electrodes 112 and 113 in the Y-axis direction, the first and second internal electrodes 112 and 113 being disposed in the surface layer portions 116a.

Furthermore, increase in the content of magnesium in the covers 120 leads to increase in the amount of magnesium supplied from the covers 120 to the first and second internal electrodes 112 and 113. The magnesium supplied from the covers 120 easily reaches the surface layer portions 116a, but has difficulty in reaching the center portion 116b.

Therefore, the increase in the content of magnesium in the covers 120 enables magnesium to be selectively supplied to the end portions of the first and second internal electrodes 112 and 113 in the Y-axis direction, the first and second internal electrodes 112 and 113 being disposed in the surface layer portions 116a. Therefore, only the dimensions Da of the oxidized regions 12a and 13a disposed in the surface layer portions 16a can be increased.

The method as described above can variously control the dimensions Da and Db of the oxidized regions 12a and 13a. Therefore, the oxidized regions 12a and 13a having various configurations including the configuration shown in FIG. 5 can be formed. It should be noted that the method of controlling the dimensions Da and Db of the oxidized regions 12a and 13a is not limited to the above.

3.6 Step S06: Formation of External Electrodes

In Step S06, the first external electrode 14 and the second external electrode 15 are formed on the ceramic body 11 obtained in Step S05, to produce the multi-layer ceramic capacitor 10 shown in FIGS. 1 to 3. In Step S06, for example, base films, intermediate films, and surface films forming the first and second external electrodes 14 and 15 are formed on the end surfaces of the ceramic body 11 in the X-axis direction.

More specifically, in Step S06, first, an unsintered electrode material is applied so as to cover both the end surfaces of the ceramic body 11 in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S06 described above may be performed before Step S05. For example, before Step S05, the unsintered electrode material may be applied to both the end surfaces of the unsintered ceramic body 111 that are oriented in the X-axis direction. As a result, in Step S05, sintering of the unsintered ceramic body 111 and baking of the unsintered electrode material can be simultaneously performed.

4. Example and Comparative Example

For the Example and Comparative Example of this embodiment, samples of the multi-layer ceramic capacitor 10 were produced by the production method described above. In those samples, the dimension in the X-axis direction was set to 1 mm, and the dimensions in the Y- and Z-axis directions were set to 0.5 mm. Further, in those samples, the average thickness T of the ceramic layers 21 was set to 0.4 μm or less.

In those samples, a ratio Da/T of the dimension Da of the oxidized region 12a (13a) in the surface layer portion 16a to the average thickness T of the ceramic layers 21 was variously changed within the range from 0 to 6. It should be noted that a sample in which the ratio Da/T of the oxidized region 12a (13a) is zero does not include the oxidized region 12a (13a).

First, a short circuit rate was evaluated for the samples. The short circuit rate was evaluated with an LCR meter under the conditions where an oscillation level (Osc) is 0.5 V and a voltage with the frequency of 1 kHz is applied. For each of the samples, 200 pieces were evaluated, and the proportion of the pieces in which a short circuit has occurred out of the 200 pieces was assumed as a short circuit rate.

Figure 14:
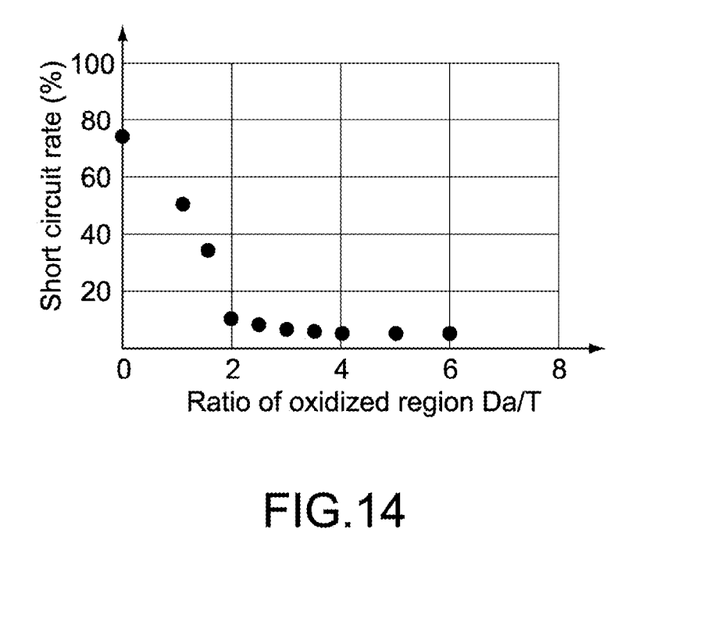
FIG. 14 is a graph showing evaluation results of a short circuit rate.

FIG. 14 is a graph showing the change in short circuit rate according to the ratio Da/T of the oxidized region 12a (13a). In the region where the ratio Da/T of the oxidized region 12a (13a) is less than 2, the short circuit rate exhibited the tendency of monotonically decreasing. Meanwhile, in the region where the ratio Da/T of the oxidized region 12a (13a) is 2 or more, the short circuit rate was substantially constant.

Further, in the region where the ratio Da/T of the oxidized region 12a (13a) is 2 or more, the short circuit rate falls within approximately 10%. Those results reveal that when the dimension Da of the oxidized region 12a (13a) in the surface layer portion 16a is set to be equal to or more than two times the average thickness T of the ceramic layers 21, a multi-layer ceramic capacitor 10 having a low short circuit rate is obtained.

Next, a failure rate in soldering-heat resistance was evaluated for the samples. In the evaluation of the failure rate in soldering-heat resistance, conditions for the case where each sample is mounted to a substrate were replicated, and each sample was immersed in molten solder having a temperature of 270° C. for five seconds. For each of the samples, 200 pieces were evaluated, and the proportion of the pieces in which a crack has occurred out of the 200 pieces was assumed as a failure rate in soldering-heat resistance.

Figure 15:
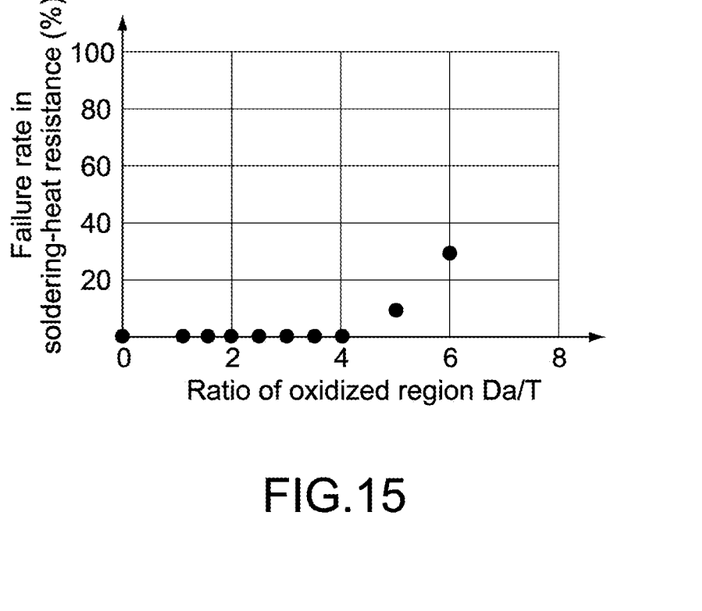
FIG. 15 is a graph showing evaluation results of a failure rate in soldering-heat resistance.

FIG. 15 is a graph showing the change in failure rate in soldering-heat resistance according to the ratio Da/T of the oxidized region 12a (13a). In the region where the ratio Da/T of the oxidized region 12a (13a) is 4 or less, the failure in soldering-heat resistance does not occur. Meanwhile, in the region where the ratio Da/T of the oxidized region 12a (13a) exceeds 4, the failure in soldering-heat resistance occurs.

Those results reveal that, in the samples having large dimensions Da of the oxidized regions 12a and 13a, internal stress in the ceramic body 11 is large and a crack is likely to occur. As a result, the dimensions Da of the oxidized regions 12a and 13a in the surface layer portions 16a are desirably kept to be equal to or less than four times the average thickness T of the ceramic layers 21.

5. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 19 may be divided into capacitance forming units in the Z-axis direction. In this case, in each capacitance forming unit 19, the first internal electrodes 12 and the second internal electrodes 13 only need to be alternately disposed along the Z-axis direction. In a portion where the capacitance forming units 19 are next to each other, the first internal electrodes 12 or the second internal electrodes 13 may be continuously disposed.

What is claimed is:

1. A multi-layer ceramic capacitor, comprising:
a multi-layer unit that includes
ceramic layers laminated in a first direction,
internal electrodes disposed between the ceramic layers,
a main surface facing the first direction,
a side surface facing a second direction orthogonal to the first direction,
a surface layer portion in a range from the main surface to a predetermined depth, and
a center portion adjacent to the surface layer portion in the first direction; and
a side margin that covers the side surface of the multi-layer unit from the second direction, such that all internal electrodes are covered from the second direction by the side margin,
the ceramic layers having an average dimension in the first direction that is 0.4 μm or less,
each of the internal electrodes including an oxidized region that is adjacent to the side margin,
the oxidized region in the surface layer portion having a dimension in the second direction that is equal to or more than two times the average dimension of the ceramic layers in the first direction and is equal to or less than four times the average dimension of the ceramic layers in the first direction, and
wherein the oxidized region in the center portion has a diension in the second direction that is smaller than the oxidized region.

2. The multi-layer ceramic capacitor according to claim 1, wherein
the predetermined depth is defined to be 10% of a dimension of the multi-layer unit in the first direction.

3. The multi-layer ceramic capacitor according to claim 1, wherein the internal electrodes include nickel as a main component.

* * * * *